United States Patent [19]

Okamura

[11] Patent Number: 5,473,365
[45] Date of Patent: Dec. 5, 1995

[54] HEAD-MOUNTED IMAGE DISPLAY APPARATUS IN WHICH A SYSTEM IS CAPABLE OF CHANGING ASPECT RATIO OF OBSERVED IMAGE

[75] Inventor: Toshiro Okamura, Tokyo, Japan

[73] Assignee: Olympus Optical Co., Ltd., Tokyo, Japan

[21] Appl. No.: 171,620

[22] Filed: Dec. 22, 1993

[30] Foreign Application Priority Data

Dec. 25, 1992 [JP] Japan .................................. 4-346086

[51] Int. Cl.⁶ .................................................. H04N 13/04
[52] U.S. Cl. .............................. 348/53; 348/51; 359/462; 359/668
[58] Field of Search ......................... 348/42, 51, 52, 348/53; 358/98; 359/668, 669, 670, 672, 671, 462, 464, 465, 466, 471, 472, 475, 477; H04N 13/00, 13/02, 13/04, 5/72, 5/74, 5/76, 5/14, 5/66, 5/68, 5/46

[56] References Cited

U.S. PATENT DOCUMENTS 3,495,891  2/1970  Lee ......................................... 359/472

FOREIGN PATENT DOCUMENTS

| | | | |
|---|---|---|---|
| 0507297 | 10/1992 | European Pat. Off. | H04N 5/76 |
| 0194783 | 8/1990 | Japan | H04N 5/74 |
| 497671 | 3/1992 | Japan . | |
| 0097671 | 3/1992 | Japan | H04N 5/72 |
| 4177986 | 6/1992 | Japan . | |
| 0291889 | 10/1992 | Japan | H04N 5/72 |
| 0002706 | 8/1983 | WIPO | 358/92 |

*Primary Examiner*—David E. Harvey
*Attorney, Agent, or Firm*—Cushman, Darby & Cushman

[57] ABSTRACT

A head-mounted image display apparatus which is capable of selectively displaying images of normal and wide sizes efficiently by utilizing approximately all the pixels of a display device without the need of removing an optical system and which provides a bright image at high resolution and is easy to handle. The head-mounted image display apparatus has an image display device (2) for displaying an image, and a projection optical system for projecting the image displayed on the image display device (2) onto an observer's eye. The projection optical system includes an anamorphic optical system which is composed of an anamorphic lens (3) and a cylindrical lens (4), for example. The anamorphic optical system is rotatable about the optical axis. Accordingly, it is possible to selectively observe two images of the normal and wide sizes by rotating the anamorphic optical system about the optical axis through 90° in either direction.

9 Claims, 4 Drawing Sheets

HEAD-MOUNTED IMAGE DISPLAY APPARATUS IN WHICH A SYSTEM IS CAPABLE OF CHANGING ASPECT RATIO OF OBSERVED IMAGE

BACKGROUND OF THE INVENTION

The present invention relates to a head-mounted image display apparatus which is retained on the observer's head. More particularly, the present invention relates to a head-mounted image display apparatus which is capable of selectively displaying images of two different sizes, i.e., a normal size and a wide size.

One type of conventional head-mounted image display apparatus is capable of selectively displaying images of two different sizes, i.e., a normal size having an aspect ratio (i.e., the ratio of width to height of the image frame) of 4:3, and a wide size having an aspect ratio of 16:9, for example. As shown in FIG. 6(a), a conventional head-mounted image display apparatus employs a display device 21 having a display area of the normal size, i.e., the aspect ratio of 4:3. When an image of the wide size is to be displayed on the display device 21, the top and bottom 22 of the display surface of the display device 21 are cut so that the aspect ratio of 16:9 is attained. With this method, however, the pixel utilization efficiency is low, and the image frame is reduced in size.

One measure which has heretofore been taken to deal with the above-described problem is to use a circular display device 23, as shown in FIG. 6(b), so that even when the aspect ratio is changed from the normal size 24 to the wide size 25, the display image frame does not reduce in size (see Japanese Patent Application Laid-Open (KOKAI) No. 04-177986 (1992)).

According to another conventional measure, an image of the wide size is displayed in a compressed form on the display device 21 of the normal size, and the compressed image is enlarged to the wide size for observation by using an optical system including a concave cylindrical mirror 26 and a concave mirror 27, or a cylindrical Fresnel lens 28, as shown in FIGS. 6(c) and 6(d) (see Japanese Patent Application Laid-Open (KOKAI) No. 04-97671 (1992)).

However, when a circular display device is used as shown in FIG. 6(b), a part of the display surface is always left unused. Therefore, the pixel utilization efficiency is low. In the case of using an optical system that enlarges the image frame in one direction as shown in FIGS. 6(c) and 6(d), it is necessary to remove the optical system from the position in front of the display device when an image of the normal size is to be displayed. Thus, the conventional technique involves problems in terms of handling.

SUMMARY OF THE INVENTION

In view of the above-described problems of the background art, it is an object of the present invention to provide a head-mounted image display apparatus which is capable of selectively displaying images of normal and wide sizes efficiently by utilizing approximately all the pixels of a display device without the need of removing an optical system and which provides a bright image at high resolution and is easy to handle.

To attain the above-described object, the present invention provides a head-mounted image display apparatus having an image display device for displaying an image, and a projection optical system for projecting the image displayed on the image display device onto an observer's eyeball, wherein the projection optical system includes an optical system for changing the aspect ratio.

In this case, the aspect ratio changing optical system is preferably an optical system for increasing the aspect ratio.

In addition, the present invention provides a head-mounted image display apparatus having an image display device for displaying an image, and a projection optical system for projecting the image displayed on the image display device onto an observer's eyeball, wherein the projection optical system includes a device for changing over the aspect ratio from a normal size to a wide size and vice versa.

In this case, the aspect ratio changeover device may be an anamorphic optical system which is rotatable about an optical axis, for example.

In addition, the present invention provides a head-mounted image display apparatus having an image display device for displaying an image, and a projection optical system for projecting the image displayed on the image display device onto an observer's eyeball, wherein the projection optical system includes an anamorphic optical system which is rotatable about an optical axis, and the image displayed on the image display device has different magnifications along the widthwise and heightwise directions thereof so as to compensate for a difference in magnification along the widthwise and heightwise directions of the displayed image which is produced by the anamorphic optical system.

In the present invention, the projection optical system, which projects the image displayed on the image display device onto the observer's eyeball, includes an anamorphic optical system, for example, which is rotatable about the optical axis. Accordingly, it is possible to selectively observe two images of the normal and wide sizes by rotating the anamorphic optical system about the optical axis through 90° in either direction. Moreover, it is unnecessary to increase the size of the image display device. In addition, the pixel utilization efficiency is high, and a bright image can be displayed at high resolution. Furthermore, no optical system needs to be removed when the aspect ratio is changed. Thus, the head-mounted image display apparatus is easy to handle.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE INVENTION

Figure 5A:
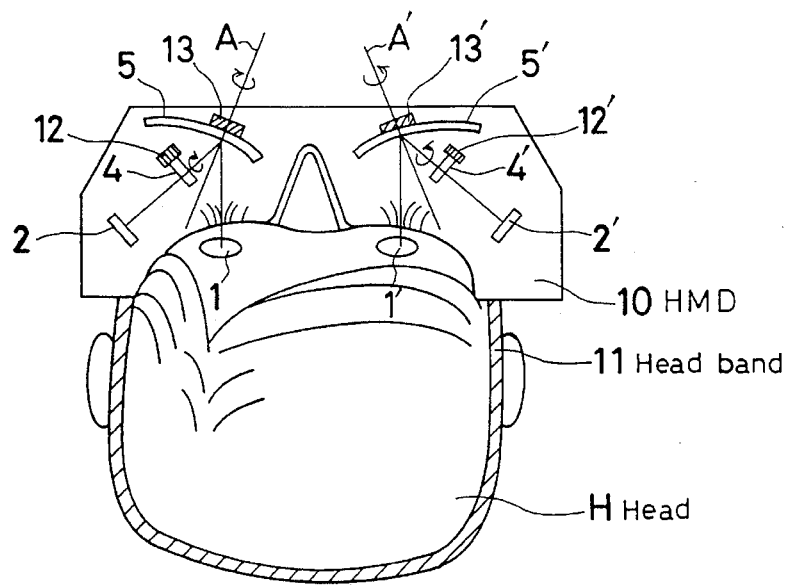
Figure 5B:
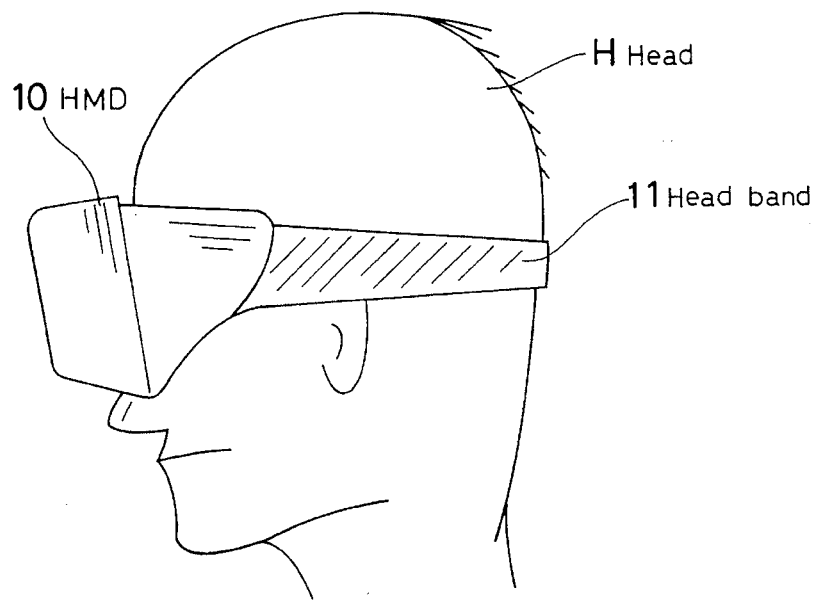

FIGS. 5(a) and 5(b) show in sectional and perspective views the general arrangement of one example in which the head-mounted image display apparatus of the present invention is attached to the observer's head.

Figure 6A:
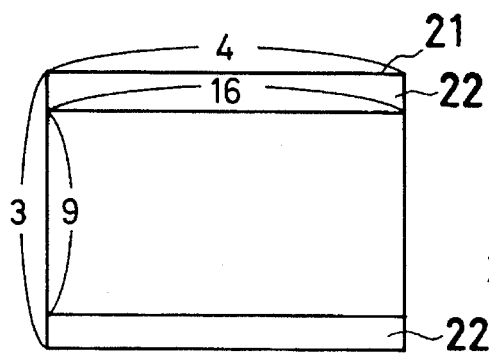
Figure 6C:
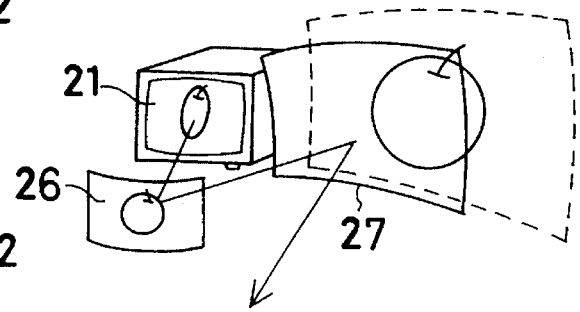
Figure 6B:
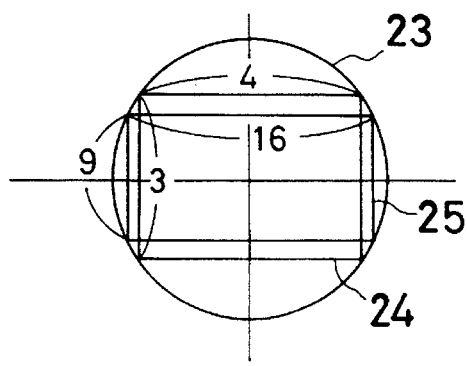
Figure 6D:
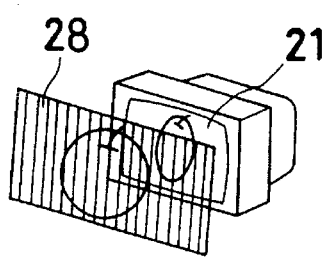

FIGS. 6(a) through 6(b) are showing conventional head-mounted image display apparatuses.

DESCRIPTION OF THE PREFERRED EMBODIMENTS

In the head-mounted image display apparatus of the present invention, the aspect ratio of the display image frame is changed over from the normal size to the wide size and vice versa as follows: A projection optical system, which projects the image frame of a display device, is formed using an anamorphic optical system. The anamorphic optical system is rotated through 90° about the optical axis, thereby enlarging or reducing the image displayed on the display device in accordance with the aspect ratio for display.

Embodiments of the present invention will be described below with reference to the accompanying drawings.

Figure 1:
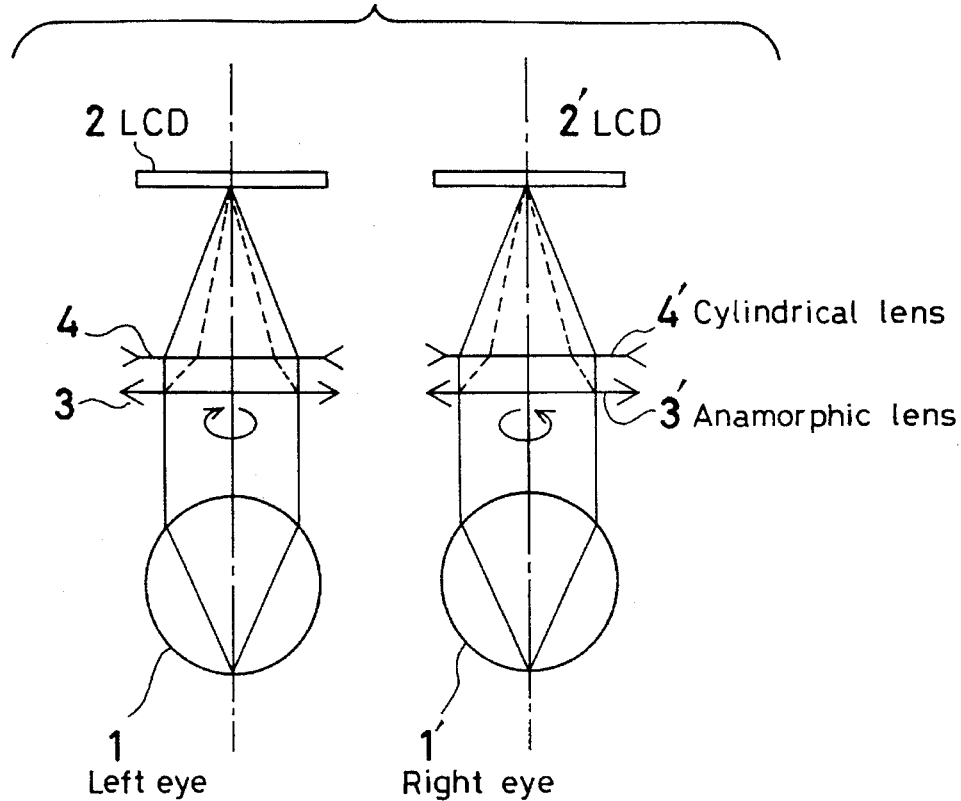
FIG. 1 shows the optical system of a first embodiment of the head-mounted image display apparatus according to the present invention.

FIG. 1 shows the optical system of a first embodiment of the head-mounted image display apparatus according to the present invention. Liquid crystal display devices (LCDs) 2 and 2' are adapted to display respective images for an observer's left and right eyes 1 and 1'. The aspect ratio of the image frames of the LCDs 2 and 2' has been set to 1.5396:1 (width to height). Two pairs of anamorphic lenses 3 and 3' and cylindrical lenses 4 and 4' are disposed so that each pair of anamorphic and cylindrical lenses rotate as one unit about the optical axis for each eye.

It is assumed that the curved surfaces of the cylindrical lenses 4 and 4' are concave surfaces that and the focal length of these lenses is $f_s$. It is also assumed that the focal length of each of the anamorphic lenses 3 and 3' is $f_{Ar}$ in a section along the curved surface of the cylindrical lens 4 (4') and $f_{Ah}$ in a section containing the generator and optical axis of the cylindrical lens 4 (4'). The composite focal length of each pair of anamorphic and cylindrical lenses 3 and 4, and 3' and 4' is $f_{Ah}$ in a section containing the generator of the cylindrical lens 4 (4'). The composite focal length in a section perpendicular to the generator is given by $$F=1/(1/f_s+1/f_{Ar}-d/f_sf_{Ar})$$

where d is the lens spacing.

In order to allow the focal points in the two sections to coincide with each other, the following condition must be satisfied:

$$f_{Ah}=(f_sf_{Ar}+df_{Ar}-d^2)/(f_{Ar}+f_s-d)$$

Further, the ratio between the focal lengths in the two sections should be $F/f_{Ah}=1.1547$.

With the above-described arrangement, when the generators of the cylindrical lenses 4 and 4' lie in the vertical direction (optical paths at this time are shown by the dotted lines in FIG. 1), the ratio of the widthwise (horizontal) magnification to the heightwise (vertical) magnification of the image observed by the eyes 1 and 1' is 1.1547:1. Accordingly, the aspect ratio of the image on the display surface of each of the LCDs 2 and 2' is 16:9. When the anamorphic optical systems, which are respectively composed of pairs of integrated anamorphic and cylindrical lenses 3 and 4, and 3' and 4', are rotated through 90° about the respective optical axes (optical paths at this time are shown by the solid lines), the aspect ratio of the image on the display surface of each of the LCDs 2 and 2' becomes 4:3.

Therefore, an image signal of the wide size is compressed to 1/1.1547 horizontally, whereas an image signal of the normal size is compressed to 1/1.1547 vertically, and the image thus compressed is displayed on the LCDs 2 and 2'. In this state, the anamorphic optical systems are rotated through 90° in either direction about the respective optical axes. Thus, it is possible to observe either of the two images of the normal and wide sizes as desired. Moreover, the pixel utilization efficiency is high, and there is no particular increase in size of the display device.

It should be noted that when an image signal of the wide size is displayed on an image display device, e.g., an ordinary television, an image which is narrow relative to the height thereof is displayed. In such a case, if the image is enlarged in the widthwise direction by using the above-described anamorphic optical system, an image of the wide size is satisfactorily reproduced.

Figure 2:
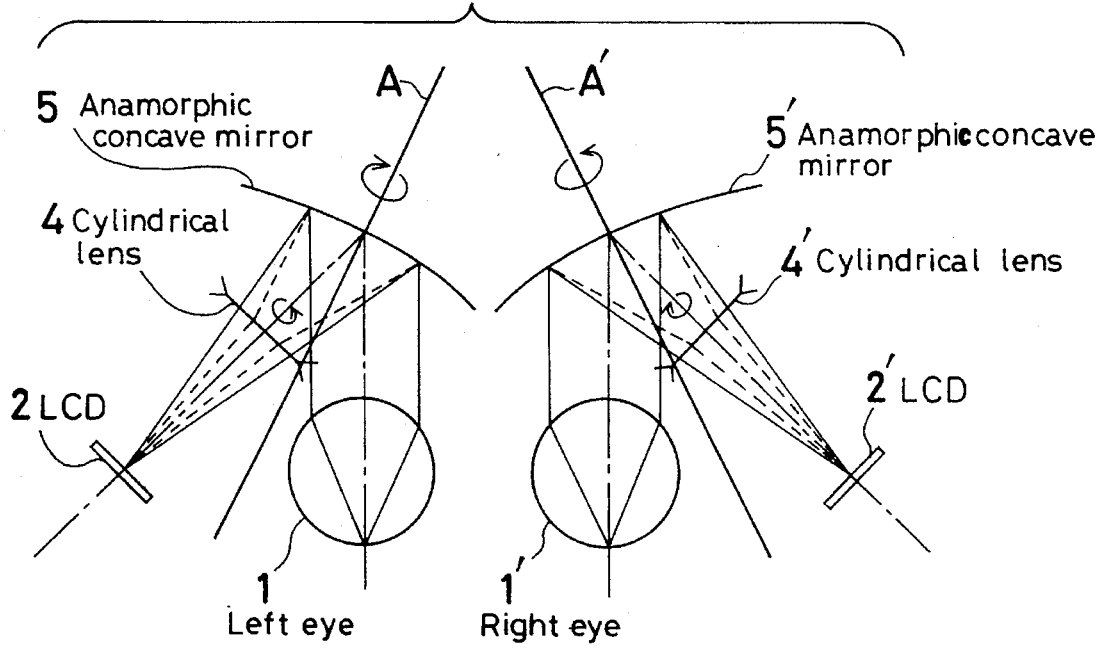
FIG. 2 shows the optical system of a second embodiment of the head-mounted image display apparatus according to the present invention.

Next, a second embodiment of the present invention will be described with reference to FIG. 2. In this embodiment, cylindrical lenses 4 and 4' and anamorphic concave mirrors 5 and 5' are employed to constitute two anamorphic optical systems. Referring to FIG. 2, the aspect ratio of the image frame of each of the left and right LCDs 2 and 2' is set at 1.5396:1 (width to height). The cylindrical lenses 4 and 4' are disposed so as to rotate about respective optical axes. The anamorphic concave mirrors 5 and 5' are disposed so as to rotate about respective axes A and A' each connecting the center of curvature in the vertical and horizontal directions of the mirror and a point at which the optical axis turns around (it should be noted that in this application such rotation is also referred to as "rotation about an optical axis). The optical systems, which are composed of the cylindrical lenses 4 and 4' and the anamorphic concave mirrors 5 and 5', are designed so that the ratio of the widthwise magnification to the heightwise magnification is 1.1547:1.

In this embodiment also, when the ratio of the widthwise magnification to the heightwise magnification of the anamorphic optical systems is 1.1547:1, the aspect ratio of the observed image, which is displayed on the display surface of each of the LCDs 2 and 2', is 16:9. When the anamorphic concave mirrors 5 and 5' and the cylindrical lenses 4 and 4' are rotated through 90° about the respective optical axes, the aspect ratio of the image becomes 4:3. If an image of the wide size is displayed being compressed to 1/1.1547 horizontally, while an image of the normal size is displayed being compressed to 1/1.1547 vertically, either of the two images of the normal and wide sizes can be observed as a distortion-free, normal image by rotating the cylindrical lenses 4 and 4' and the anamorphic concave mirrors 5 and 5'. It should be noted that the second embodiment has an advantage in that it is possible to form a head-mounted image display apparatus which projects forwardly from the observer's face to a minimal extent, in addition to the advantages of the first embodiment.

Figure 3:
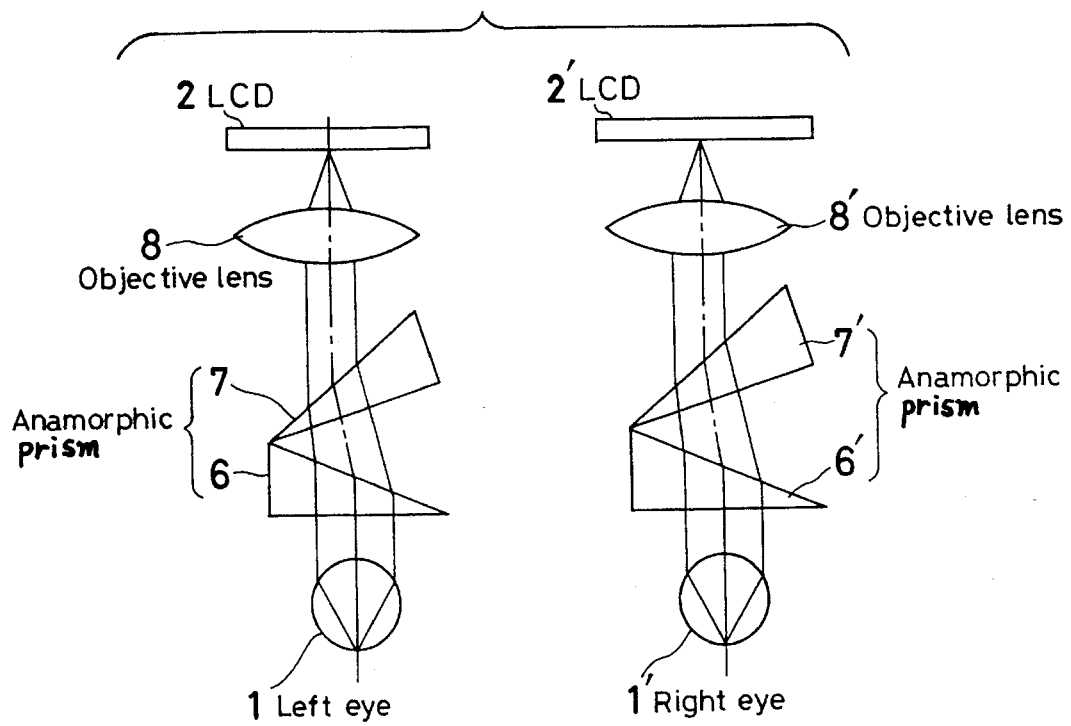
FIG. 3 shows the optical system of a third embodiment of the head-mounted image display apparatus according to the present invention.
Figure 4:
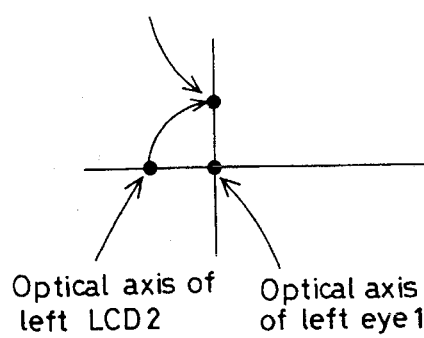
FIG. 4 shows the way in which optical axes move as prisms rotate in the arrangement shown in FIG. 3.
Figure 4:
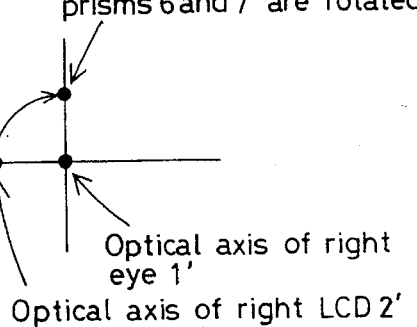

FIG. 3 shows a third embodiment of the present invention. In this embodiment, the cylindrical lenses 4 and 4' and the anamorphic lenses 3 and 3' in the first embodiment are replaced by pairs of anamorphic prisms 6 and 7, and 6' and 7', together with objective lenses 8 and 8'. The anamorphic prisms 6 and 7, and 6' and 7' are set so that the magnification in the vertical direction is 1.1547 because the magnification in the horizontal direction is 1. As the anamorphic prisms 6 and 7, and 6' and 7' rotate, the respective optical axes of the LCDs 2 and 2' move as shown in FIG. 4. Accordingly, the pairs of anamorphic prisms 6 and 7, and 6' and 7' are rotated through 90° as one unit each about the respective optical axes of the eyes 1 and 1', and the two LCDs 2 and 2' are adjusted both vertically and horizontally so as to compensate for the movement of the optical axes with the spacing between the LCDs 2 and 2' maintained. Thus, the aspect ratio of the image frame can be changed over between 16:9 and 4:3. It should be noted that the third embodiment has an advantage in that the production of the head-mounted image display apparatus is facilitated because anamorphic prisms are easier to produce than cylindrical lenses, in addition to the advantages of the first embodiment.

It should be noted that, in actual use, the headmounted display apparatus (HMD) 10 of the present invention is mounted on the observer's head H with a head band 11 attached to the display apparatus, for example, as shown in FIG. 5(*a*), which is a sectional view showing the general arrangement of the display apparatus (in which the optical system shown in FIG. 2 is employed as an example), and also shown in FIG. 5(*b*), which is a perspective view of the general arrangement. In FIG. 5(*a*), reference numerals 12 and 12' denote rotating driving devices, e.g., motors, for rotating the left and right cylindrical lenses 4 and 4' about the respective optical axes, and reference numerals 13 and 13' denote similar rotating driving devices for rotating the left and right anamorphic concave mirrors 5 and 5' about the respective axes A and A'.

Although the head-mounted image display apparatus of the present invention has been described by way of some embodiments, it should be noted that the present invention is not necessarily limited to these embodiments and that various changes and modifications may be imparted thereto.

As will be clear from the foregoing description, according to the head-mounted image display apparatus of the present invention, the projection optical system, which projects an image displayed on an image display device onto an observer's eyeball, includes an anamorphic optical system, for example, which is rotatable about the optical axis. Accordingly, it is possible to selectively observe two images of the normal and wide sizes by rotating the anamorphic optical system about the optical axis through 90° in either direction. Moreover, it is unnecessary to increase the size of the image display device. In addition, the pixel utilization efficiency is high, and a bright image can be displayed at high resolution. Furthermore, no optical system needs to be removed when the aspect ratio is changed. Thus, the head-mounted image display apparatus is easy to handle.

What I claim is:

1. A head-mounted image display apparatus comprising:
   a main unit including:
   an image display device for displaying an image,
   a projection optical system for projecting said image displayed by said image display device onto an observer's eyeball, and
   means for changing over a ratio of magnification with respect to widthwise and heightwise directions between a respective normal image aspect ratio of said Widthwise direction to said heightwise direction and a respective wide image aspect ratio of said widthwise direction to said heightwise direction, and vice versa, said means for changing over said ratio of magnification being operated by moving at least one optical element of said projecting optical system about an optical path of said image; and
   mounting means provided for mounting said main unit on said observer's head.

2. A head-mounted image display apparatus according to claim 1, wherein said means for changing over said ratio of magnification is an anamorphic optical system which is rotatable, with respect to said image display device, about an optical axis.

3. A head-mounted image display apparatus comprising:
   an image display device for displaying an image; and
   a projection optical system, including support for mounting said projection optical system to a head, for projecting said image displayed on said image display device onto an observer's eyeball, said projection optical system including an anamorphic optical system which is rotatable, with respect to said image display device, about an optical axis, and said image displayed on said image display device has different magnifications along widthwise and heightwise directions thereof so as to compensate for a difference in magnification along said widthwise and said heightwise directions of said image projected by said projection optical system, the rotation of said anamorphic optical system causing said different magnifications along widthwise and heightwise directions of said image displayed on said image display device.

4. A head-mounted image display apparatus according to claim 2, wherein said anamorphic optical system comprises a concave mirror.

5. A head-mounted image display apparatus according to claim 2, wherein said anamorphic optical system comprises a cylindrical lens.

6. A head-mounted image display apparatus according to claim 2, wherein said anamorphic optical system comprises a prism.

7. A head-mounted image display apparatus according to claim 3, wherein said anamorphic optical system comprises a concave mirror.

8. A head-mounted image display apparatus according to claim 3, wherein said anamorphic optical system comprises a cylindrical lens.

9. A head-mounted image display apparatus according to claim 3, wherein said anamorphic optical system comprises a prism.

* * * * *